United States Patent
Mott

[11] Patent Number: 5,176,587
[45] Date of Patent: Jan. 5, 1993

[54] SINGLE PIN ROCKER JOINT BUSHING CHAIN

[75] Inventor: Philip J. Mott, Dryden, N.Y.

[73] Assignee: Borg-Warner Automotive Transmission & Engine Components Corporation, Sterling Heights, Mich.

[21] Appl. No.: 778,402

[22] Filed: Oct. 17, 1991

[51] Int. Cl.⁵ ............................................. F16G 13/04
[52] U.S. Cl. ................................. 474/216; 474/229
[58] Field of Search ........................... 474/212–217, 474/226, 228–231

[56] References Cited

U.S. PATENT DOCUMENTS

| | | |
|---|---|---|
| 2,667,791 | 12/1950 | Bremer . |
| 3,153,348 | 10/1964 | Kuntzmann ............... 474/213 X |
| 3,324,737 | 6/1967 | Onulak ........................ 474/230 |
| 3,661,025 | 5/1972 | Avramidis ................... 474/217 |
| 3,931,706 | 1/1976 | McKeon et al. .......... 474/231 X |
| 4,129,045 | 12/1978 | Kishitani ..................... 474/231 |
| 4,186,617 | 2/1980 | Avramidis et al. . |
| 4,337,057 | 6/1982 | Horowitz et al. . |
| 4,342,560 | 8/1982 | Ledvina et al. . |
| 4,507,106 | 3/1985 | Cole, Jr. . |
| 4,729,756 | 3/1988 | Zimmer ....................... 474/214 |
| 4,911,682 | 3/1990 | Ivey et al. . |
| 5,007,883 | 4/1991 | Cole, Jr. et al. . |

FOREIGN PATENT DOCUMENTS

| | | | |
|---|---|---|---|
| 450625 | 2/1949 | Italy ............................ 474/231 |
| 22794 | 12/1891 | United Kingdom ............. 474/231 |
| 356654 | 9/1931 | United Kingdom ............. 474/231 |

Primary Examiner—Ramon S. Britts
Assistant Examiner—Roger J. Schoeppel
Attorney, Agent, or Firm—Willian Brinks Olds; Greg Dziegielewski

[57] ABSTRACT

A rocker joint is provided which is constructed from the pins and bushings of the links. The pin members have a working front surface and a convex back surface. The bushings have apertures therein which include an arcuate working surface. The pins are disposed in the apertures of the bushings such that the pin member working surface engages and rocks on the curved surface defined by the aperture of the bushing. The rocker joint has application to roller chain and silent bushing chain.

20 Claims, 3 Drawing Sheets

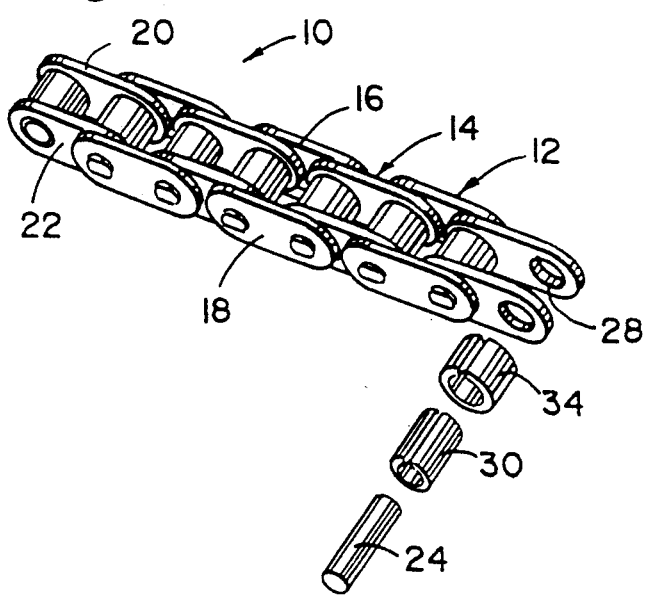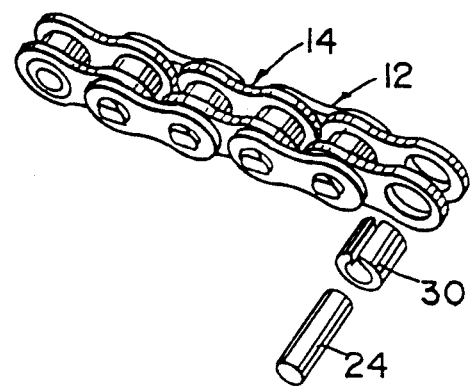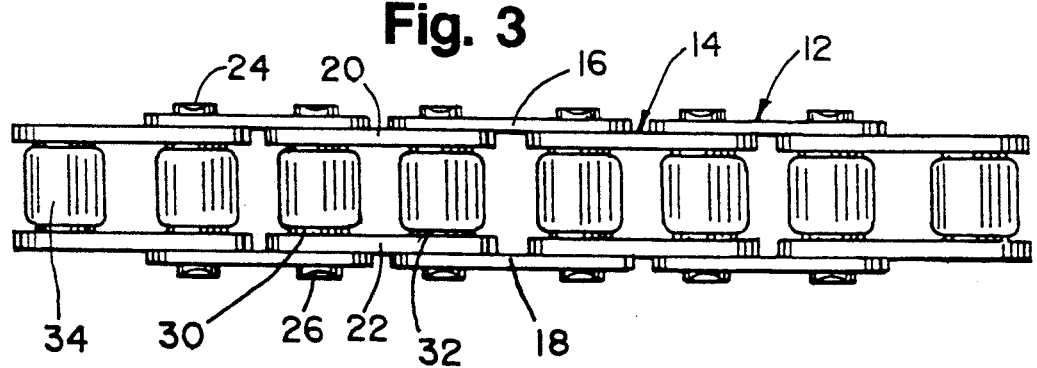

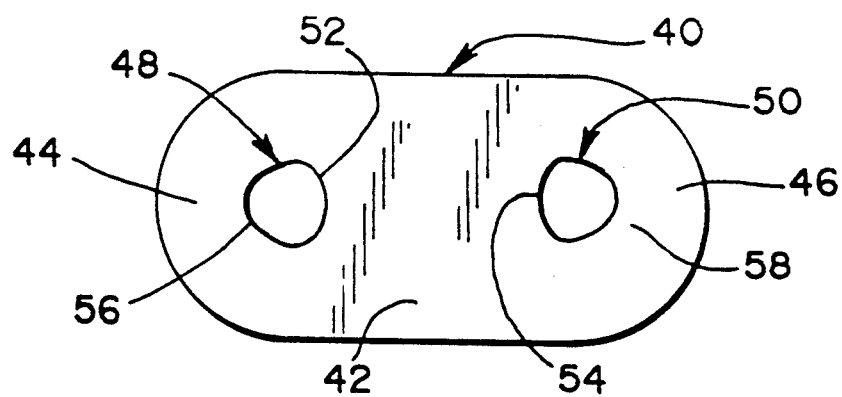
Fig. 6
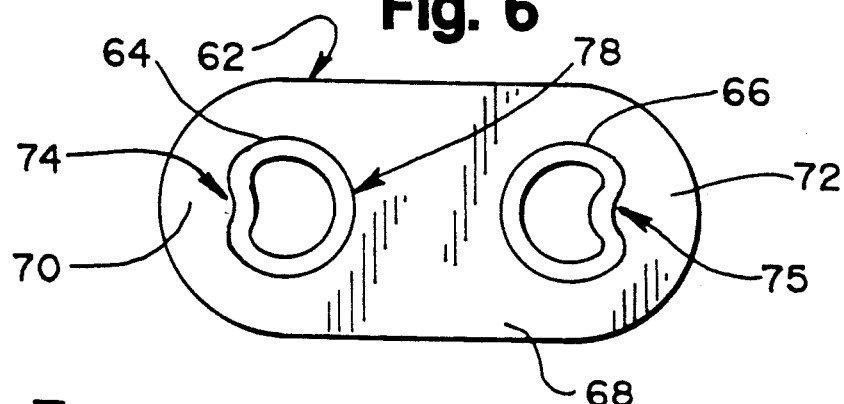
Fig. 7
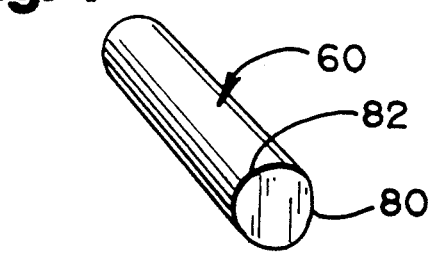
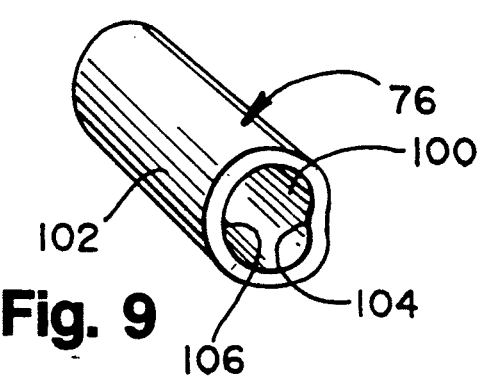
Fig. 8
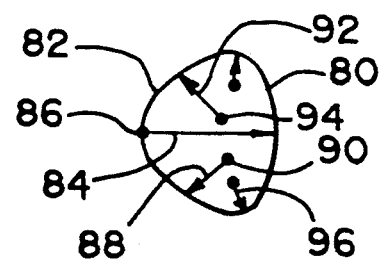
Fig. 9
Fig. 10
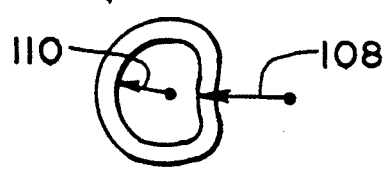

SINGLE PIN ROCKER JOINT BUSHING CHAIN

BACKGROUND OF THE INVENTION

Reference is made to co-pending U.S. application Ser. No. 07/778,409, filed Oct. 17, 1991, to Edward H. Cole, Jr., and Philip J. Mott, entitled "Single Pin Rocker Joint Chain," which is related to the subject matter of the present application, and is incorporated herein by reference.

1. Field of the Invention

The present invention relates generally to power transmission chains. More particularly, the present invention relates to a rocker joint for bushing chain or roller chain, which utilize a single pin. The invention has particular application to roller chains, which are used in engine timing applications as well as industrial applications. The invention also has application to silent chains, as well as chain-belts for use with continuously variable transmissions.

2. Description of the Prior Art

Power transmission chains are widely used in the automotive industry. Such chains are used for engine timing drives as well as for the transfer of power from the engine to the transmission or for the transfer of power in a transfer case. Power transmission chains are also widely used in industrial applications.

One type of power transmission chain is referred to as "silent chain". Silent chain is formed of interleaved sets of inverted tooth links. A set or rank of links is assembled from several links positioned alongside of or adjacent to each other. The links are connected by pivot means, which are typically round pins received in a pair of apertures. The pivot means may include a bushing inserted in one or both of the apertures of the links around the pins. An example of silent chain is found in U.S. Pat. No. 4,342,560, which is incorporated herein by reference.

A second type of chain is know as "roller chain". A typical roller chain consists of alternate inner links and outer links. The inner links, which are also known as "bushing" links, consist of spaced sidebars with bushings tightly received in openings, or apertures, at each end of the sidebars. The outer links, which are also know as "pin" links or guide links, consist of spaced sidebars with pins tightly received in openings, or apertures, at each end of the sidebars. The bushings freely rotate about the pins to pivotally connect the outer links to the inner links in alternate arrangement. Rollers are mounted for rotation about the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chain drives can include both "true roller" and rollerless design. The true roller design includes the described rollers mounted about the bushings to contact the sprocket teeth. Rollerless chain contains bushings that directly contact the sprocket teeth. Both types of roller chain are typically specified in industry as British Standard chain and American National Standards Institute (ANSI) chain.

Another type of power transmission chain is used to transfer power between a pair of variable pulleys in a continuously variable transmission. The chain links are provided in sets that are interleaved together and have aligned apertures in the links that receive pivot means. Load blocks are positioned on the chain between the spaced pivot members and provide the means for transfer of power between the variable pulleys. The load blocks can be in the form of struts that are carried in a passageway below the links. Alternatively, the load blocks can extend around the links of the chain and have one or more windows for receiving the chain. The load blocks have tapered outer or end surfaces which engage the sheave faces of the pulleys to provide the driving engagement between the pulleys and the chain. Alternatively, the pivot members can directly engage the pulley sheaves. Examples of power transmission chains suitable for use in variable pulley transmissions, or continuously variable transmissions, are shown in U.S. Pat. No(s). 4,911,682, and 5,007,883, which are incorporated herein by reference.

The present invention relates to an improved rocker joint for power transmission chain, and particularly, for bushing silent chain or roller chain. Rocker joints are utilized in chains in an attempt to attain higher efficiencies and less wear than comparable round pin joints. Round pin joints typically produce higher wear as a result of the sliding action between the round pin and the inside of the circular link aperture. In contrast, rocker joints provide a lower wear joint on account of the rocking engagement between the pin and the rocker portion. The rocking engagement provides a rolling action between the pin and rocker, as contrasted with the sliding action between the pin and the aperture of the round pin joint.

Rocker joints for chains are known in the art. U.S. Pat. No. 4,186,617 discloses a rocker joint for a roller chain. Instead of bushings, the sidebars of both the inner links and the outer links have a second pin extending therebetween. The pins are placed side-by-side to define a pivot joint for the links. Each sidebar has an opening of generally circular configuration with a slightly pinched waist to divide the opening into two portions. The two pins are fitted into the opening to provide the rocker joint. Rollers are loosely mounted about the pins at each joint. The patent therefore describes a two-pin rocker joint for roller chain.

U.S Pat. No. 4,507,106 discloses a rocker joint in which, in the preferred embodiment, each pin or rocker has the identical cross-section. Each pin has a front surface which rocks on the front surface of the adjacent pin. In the preferred embodiment, the pins have a front surface defined by a first radius, and a back surface defined by a second and a third radius, both progressively smaller than the first radius. A rocker joint pair fits into each group of aligned apertures in the interleaved sets of links to join the links and permit articulation.

U.S. Pat. No. 4,911,682 discloses a rocker joint that includes a pair of pins. The rocker joint has apertures that are a generally hour-glass shape with the enlarged ends receiving the pins. The front surfaces of the pins rock against one another, while the back surfaces of the pins are prevented from substantial rotation.

These prior art patents represent examples of rocker joints utilizing two pivot members or pins, or a pin and a rocker pin. The present invention relates to single pin rocker joints. U.S. Pat. No. 2,667,791 discloses a silent chain with a single pin rocker joint. The chain has a single pin with an arcuate periphery, defined by a single radius, and a relatively flat bearing surface. The link has a generally semi-circular pin receiving aperture with an arcuate bearing surface. The flat surface of the joint pin rocks against the arcuate surface of the link aperture.

Another type of single pin rocker joint for silent chain is shown in U.S. Pat. No. 4,337,057. The patent discloses a double unrolling hinge for a chain-belt for a variable pulley transmission. Both sides of the hinge pin contact the insides of the link apertures.

The present invention, in its preferred embodiment, provides an improved single pin rocker joint for a chain in which a single pin rocks against a bushing aperture. The construction of the pin and rocker of the rocker joint has the pin disposed within the bushing aperture. The bushing aperture is formed to provide the rocker portion of the joint. The roller chain includes inner links and outer links and has use in engine timing drives. The present invention can also be adapted for use in silent bushing chain. The invention also has foreseeable use in chain drives for continuously variable transmissions.

SUMMARY OF THE INVENTION

In one embodiment of the present invention, a roller chain is provided for use with a sprocket. The chain is comprised of a series of interleaved inner links, or bushing links, and outer links, or guide links. Each outer link has a pair of outer link plates fixedly mounted to spaced pin members. Each inner link has a pair of inner link plates fixedly mounted to spaced bushings. The bushings are mounted to turn on the pins of the outer links, and in this manner, the inner links are interleaved with the outer links. The bushings can include rollers mounted thereon to contact the teeth of the sprocket. Alternatively, the bushings can directly contact the teeth of the sprocket. Each of the inner links and outer links is adapted to receive a sprocket tooth between them.

Pivot members, in the form of pins and rockers, are constructed from the pin members and bushings of the links. The pin members have a working front surface and a convex back surface. The bushings have apertures therein which include an arcuate working surface. The pins are disposed in the apertures of the bushings such that the pin member working surface engages and rocks on the curved surface defined by the aperture of the bushing.

The apertures of the inner links are formed by a series of radii. The apertures are formed to prevent rotation of the bushings with respect to the inner links. That is, the apertures provide a press fit for the bushings. The apertures of the inner links may be substantially circular, as long as rotation of the bushings with respect to the inner links is prevented. The apertures of the outer or guide links have a configuration that matches the cross section of the pin. The surfaces of the apertures of the outer links act to prevent rotation of the pins with respect to the outer links. That is, the apertures of the outer links provide a press fit for the pins.

The rocker joint of the present invention may also be used in an inverted tooth silent chain or in the power transmission chain for a variable pulley transmission. In the silent chain use, the inside links include a pair of depending teeth that are formed to contact a sprocket for driving of the chain. In the use for the variable pulley transmission, the links include load carrying members in the form of load blocks. The load blocks may extend around the links or through a passageway formed in the base of the links.

The rocker joint of the present invention has use in a silent chain application of inverted tooth links that include bushings. In such a construction, the inside links are substantially identical and each contain a bushing placed within the link aperture. The bushings can be extended across an entire set of inner links in a block lacing with the rows or sets of inner links being alternated with outer or guide links. The outer links or guide links do not contain any sprocket tooth contacting members.

Use of the rocker joint of the present invention provides several advantages over the use of a round pin chain. The rocker joint provides generally higher efficiencies than the round pin joint with lower wear. Moreover, the single pin rocker joint of the present invention presents advantages over the double-pin rocker joint design of the prior art by its elimination of the additional pin.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 1 is a perspective view of a conventional roller chain of the prior art, shown partly in exploded view to illustrate the pins, links, bushings and rollers and the environment for the present invention;

FIG. 2 is a perspective view of a conventional roller chain of the prior art, shown partly in exploded view to illustrate the pins, links and bushings;

FIG. 3 is a plan view of the roller chain of the present invention;

FIG. 5 is a side view of a link form for an outer link used in the roller chain of the present invention;

FIG. 6 is a side view of a link form for an inner link used in the roller chain of the present invention;

FIG. 7 is a perspective view of a pin used in the chain of the present invention;

FIG. 8 is a detail of the cross-section of the pin of FIG. 7;

FIG. 9 is a perspective view of the bushing used in the chain of the present invention;

FIG. 10 is a detail of the cross-section of the bushing of FIG. 9; and,

DETAILED DESCRIPTION OF THE DRAWINGS

Figure 4:
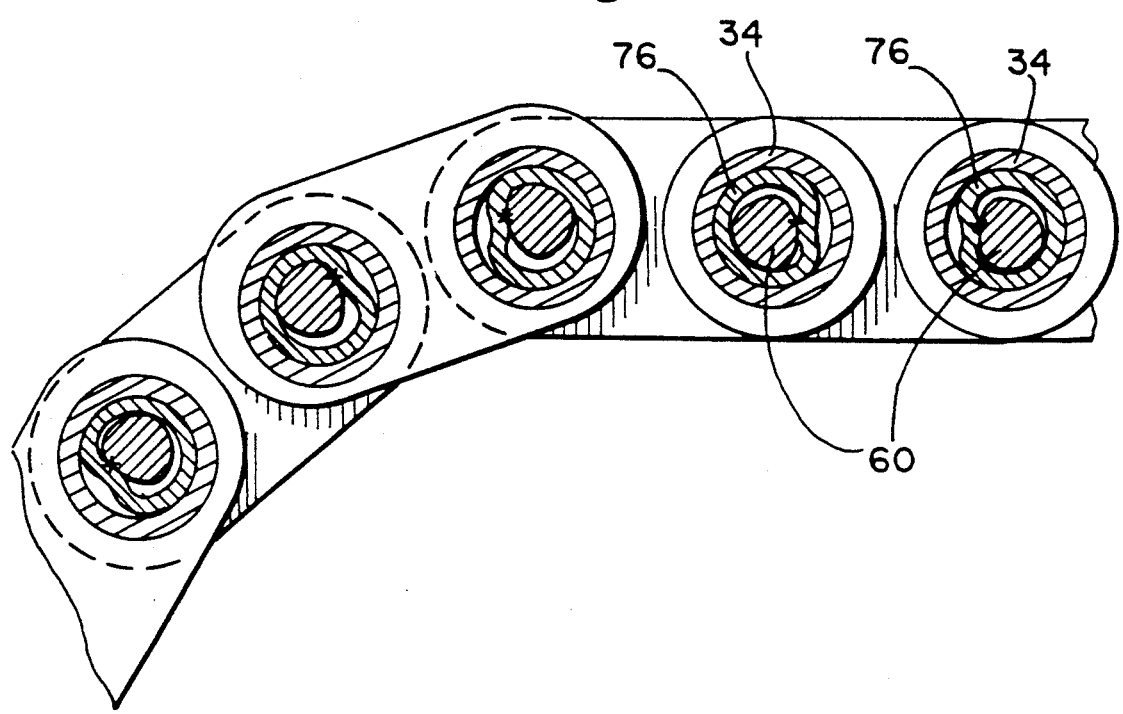
FIG. 4 is a side view of the chain of FIG. 3, shown partly in section, illustrating the articulation of the links.

Turning now to the drawings, FIG. 1 illustrates a portion of a conventional roller chain, generally at 10, which illustrates the environment of the present invention. The chain is constructed by a series of links, pins, bushings and rollers. The chain includes a series of interleaved outer links 12 and inner links 14. The outer links are formed by a pair of outer link plates 16, 18, or sidebars. The inner links are likewise formed by a pair of inner link plates 20, 22.

The outer link plates 16, 18 are fixed to a pair of pins 24, 26, as shown in FIG. 3. The pins are spaced apart and fitted through apertures 28 in the outer link plates. The pins are secured in the outer link plates by a press fit, or welding, caulking or any other means known in the art. The distance between the pins of a conventional roller chain is the pitch of the chain.

The inner link plates 20, 22 are fixed to a pair of bushings 30, 32. The bushings are generally cylindrical in shape and spaced apart and fitted through apertures 28 in the inner link plates. The bushings are secured in the inner link plates by a press fit, or by welding, caulking or any other means known in the art.

In the conventional roller chain of FIG. 1, the bushings are generally cylindrical in shape and include a circular aperture. The bushings are mounted for rotation about the pins. In the present invention, the bushings and pins, together, constitute the pin and rocker of the improved rocker joint. The rotation or pivoting of the bushings with the pins allows pivoting of the outer links with respect to the inner links.

Roller chain drives can include both the "true roller" chain shown in FIG. 1, and the rollerless design of FIG. 2. The true roller design includes the rollers 34 mounted about the bushings 30. The rollerless or "bushing" chain contains bushings 30 that directly contact the sprocket teeth. The rocker joint of the present invention has application to both true roller and rollerless chain.

Thus, the chain of FIG. 1 is constructed by inserting the pin within the bushing and the bushing within the roller. The bushings and roller are generally formed with a split ring, as shown in FIGS. 1 and 2. The bushings are then secured to a pair of inner link plates and the pins are then secured to a pair of outer link plates. The inner links and outer links are alternated in series to form an endless chain. The length of the chain and exact number of inner and outer links is determined by, among other things, the application and ratio and center distance between the sprockets.

The chain drive system typically includes a driving sprocket and a driven sprocket (not shown) and the endless chain interconnecting the sprockets. In an engine timing drive, the system can include an idler sprocket or a two driving sprockets on a crankshaft being interconnected by two endless chains with two driven sprockets on camshafts. Movement of the driving sprocket transfers power, or causes movement of the driven sprocket, through movement of the chain.

The rocker joint of the present invention utilizes a pivot means that comprises a single pin in combination with a bushing. The pin and bushing are formed to have contacting surfaces that provide a rocking engagement, as shown in FIG. 4. The pin is mounted in the sidebars of the outer links and the bushing is mounted in the sidebars of the inner links. The sidebars of the inner links and outer links for the rocker joint of the present invention are shown in detail in FIGS. 5 and 6. The pin and bushing are shown in detail in FIGS. 7, 8, 9 and 10.

The sidebar or outer link plate 40 of the outer link is illustrated in FIG. 5. The outer link plate is defined by body portion 42 and end portions 44, 46, and includes a pair of apertures 48, 50. The outer link apertures have rounded front surfaces 52, 54, which are both oriented toward the body portion 42 of the link plate. The back surfaces 56, 58 of the apertures are also rounded, with a smaller radius of curvature than the front surfaces. The outer link apertures are shaped to receive the pin 60, shown in FIG. 7, with a press fit, and thus have configurations that are matched to the configuration of the pin.

In constructing the chain of the present invention, the outer link plates 40 are provided in pairs, as shown in the chain of FIGS. 1 and 2. The apertures 48, 50 are aligned with the front and back surfaces facing the appropriate directions for insertion of the pins 60 therebetween.

The sidebar or inner link plate 62 of the inner links is illustrated in FIG. 6. Pairs of inside link plates 62 make up the inner links. The inner links are interleaved with the outer links, as shown in FIGS. 1 and 2. Link plate 62 includes a pair of spaced apertures 64, 66. The apertures define the body portion 68 and the end portions 70, 72 of the inner link plate.

The apertures are defined by a plurality of arcs. The end surface 74, which faces the end portion 70 of the link, is formed with a convex arc to provide a press fit with the outer diameter of the bushing 76. The body portion surface 78 is formed by a substantially circular arc. The end surfaces 74, 75 of the apertures of the inside link are preferably facing the end portions of the link. The apertures of the inside link may also be circular, or any configuration that will hold the bushing in a fixed relation and provide a press fit.

The end surfaces 74, 75 of the inside link plate may also be reversed and facing each other. In such a construction, the front and back surfaces of the apertures of the outer link plate should also be reversed so that the directions of the bushings of the inner links are reversed to allow the formation of the rocker joint. As shown in FIG. 4, the directions of the apertures of the outer links and inner links must be matched to permit assembly of the pins and bushings into the rocker joint.

The pivot means of the rocker joint of the present invention is illustrated in FIG. 4, which illustrates the details in cross section. The pivot means includes pin 60 and bushing 76. The pin is illustrated in detail in FIGS. 7 and 8 and the bushing is illustrated in detail in FIGS. 9 and 10. The pin includes a rounded front working surface 80 and an arcuate back surface 82. In the preferred embodiment, the front surface is formed primarily by radius 84, struck from centerpoint 86. The back surface 82 is constructed of arcs formed by a plurality of radii. These radii include radius 88, struck from centerpoint 90 and radius 92, struck from centerpoint 94. The two surfaces are interconnected by blend radii, such as blend radius 96.

The bushing 76 is shown in FIG. 9. The bushing includes an inner portion 100, formed by the aperture through the length of the bushing, and an outer portion 102. The inner portion has curved front working surface 104 and an arcuate back surface 106. The surfaces are shown more clearly in the detail of FIG. 10. The curved working surface is formed by a radius 108, while the back surface is formed by radius 110 into a substantially circular surface.

Figure 11:
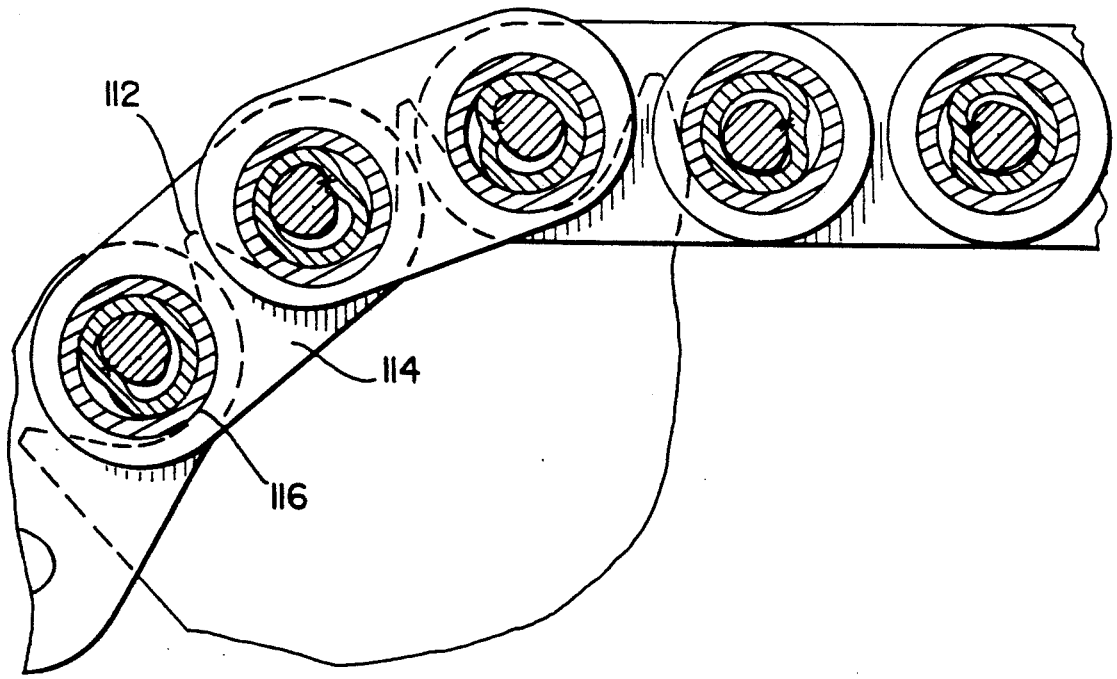
FIG. 11 is side view of the chain of the present invention, shown partly in section, mounted on a sprocket.

The working surface 104 of the bushing forms the rocking surface for contact with the working surface 80 of the pin. As shown in FIG. 4, the pin rocks against the bushing surface during articulation of the chain. As shown in FIG. 11, the rollers of the chain contact the teeth 112 of a sprocket 114. The rollers seat in the root 116 between the sprocket teeth 112. The outer links and inner links are constructed so that the teeth of the sprocket can be received between the link plates and between the rollers.

In operation, the movement of the rocker joint relative to the links of the chain, is illustrated in FIGS. 4 and 11. The rocking contact of the front surface of the pin with the working surface of the bushing occurs at contact point 120. The location of the contact point 120 is illustrated for several of the links of the chain to illustrate its approximate location for different positions of the link around the sprocket.

The pins are placed between the outer links by facing the working surfaces of the outer plates away from each other. The bushings are placed between the inner links by facing the inner working surfaces toward the end portions of the inner links. The inner links and outer links are interleaved by placing pins within the bushings and securing the bushings to the inner link plates and then the pins to the outer link plates. The chain of the present invention is therefore constructed in the same manner as the chain of FIGS. 1 and 2. The present invention provides the rocking contact between the pin and the bushing aperture.

In a silent chain application of the present invention, the inside links are provided with load carrying members or toes, which contact the teeth of the sprocket. The outer links, or guide links, maintain the lateral alignment of the chain on the sprockets. The guide links are along the outside of the chain and have no driving engagement with the sprocket teeth. Thus, the guide links are distinguished from the inner links, or driving links. The pin is shaped for a press fit within the apertures of the guide links. The bushing is mounted about the pin and is shaped for a press fit within the apertures of the inside links. The bushing can be constructed of a width for fit within the apertures of a block of links. The links are preferably in block laced form. The pin and bushing are in rocking engagement, as previously described.

An example of block lacing in silent chain for an engine timing drive is shown in U.S. Pat. No. 4,759,740, which is incorporated herein by reference. The inside links are substantially identical and placed side-by-side in the row to form a block. Rows or sets of such block laced inside links are preferably alternated with guide link rows. The sets of guide links do not contain any sprocket tooth contacting members.

In the block laced construction, the block of inside links forms a curved aperture, which is substantially continuous across the width of the chain. The bushing is placed within this aperture for rocking contact with the pin. The block construction allows use of the single pin and only one type of inside link. Without the block lacing construction, a second type of inside link, with the apertures reversed in direction, would be necessary for lacing of the chain, if the bushing is extended across the width of the chain.

The use of the single pin rocker joint of the present invention in the block lacing construction combines the benefits of the block lacing with the benefits of a rocker pin joint. The rocker joint is generally of higher efficiency than the round pin joint and has lower wear.

The single pin rocker joint of the present invention can be used with silent chain, as described, or also with the chain used for a variable pulley transmission. In such a chain, the power transfer occurs through load block members that either encircle the links or are placed in a passageway beneath the links. An example of a power transmission chain for use in a variable pulley transmission, with load block members encircling the links, is shown in U.S. Pat. No. 4,911,682.

The combination of the rocker joint of the present chain with other types of chain and configurations of links is also possible. The rocker joint can be used in silent chain in which the configurations of the links are mixed.

While several embodiments of the invention have been described and illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A chain for use with a sprocket, said chain having a series of interleaved inner links and outer links;
   each outer link having a pair of outer link plates fixedly mounted to spaced pin members, said pin members having front working surfaces and back surfaces, said pin front working surface being a rocking contact surface;
   each inner link having a pair of bushings, said bushings having apertures with convexly curved arcuate working surfaces extending along a portion of their inside length, said bushings being mounted to turn about said pin members of said outer links, said inner links having inner link plates fixedly mounted to said bushings;
   each of said inner links and said outer links being adapted to contact a sprocket tooth;
   said pin members being received in the apertures of some of said bushings such that the front working surface of said pin member and said convexly curved arcuate working surface of said bushing aperture engage and rock on one another.

2. The chain set forth in claim 1 wherein said chain includes a roller mounted to turn on each bushing and adapted to contact the teeth of a sprocket.

3. The chain set forth in claim 1 wherein said pin member has a front surface defined by a first radius, and a convex back surface defined by a different radius.

4. The chain set forth in claim 3 wherein said pin member front surface is arcuate.

5. The chain set forth in claim 1 wherein the back surface of said pin member is movable in the aperture of said bushing as the surfaces move relative to one another as the chain articulates.

6. The chain set forth in claim 5 wherein said outer links have a pair of apertures having at least one curved surface and said apertures within said bushings have a plurality of curved surfaces.

7. The chain set forth in claim 6 wherein said pin member is received in the aperture of said outer link such that said pin member back surface engages the curved surface defined by said outer link, thereby preventing substantial rotation of said pin member relative to said outer link.

8. The chain set forth in claim 7 wherein said pin member is received in the aperture of said outer link such that said pin member front working surface engages a surface defined by said outer link, thereby preventing substantial rotation of said pin member relative to said outer link.

9. The chain set forth in claim 7 wherein said pin member has an arcuate front working surface and a convex back surface connected by a series of curved surfaces.

10. The chain set forth in claim 6 wherein said apertures of said bushings include at least two convex curves, each of said convex curves being defined by a radius having a center point, each of said centers of said radii being on the same side of the aperture.

11. The chain set forth in claim 1 wherein said inner links include a pair of toes separated by a crotch.

12. A rocker joint for a chain constructed of an assembly of links and pivot members, said chain comprising a plurality of sets of interleaved links, each link being interleaved with adjacent links by said pivot members, said pivot members including a pin and rocker, said rocker being defined by a bushing member inserted in an aperture of said link, at least one of said pins having a front working surface and a convex back surface, said pin front working surface being a rocking contact surface, said bushing having an aperture with a convexly curved arcuate working surface extending along its length, said pin being disposed within said bushing such that the front working surface of said pin and said convexly curved arcuate working surface of said bushing aperture engage and rock on one another.

13. The rocker joint of claim 12 wherein the back surface of said pin is movable in the aperture of the bushing as the surfaces move relative to one another when the chain articulates.

14. The rocker joint of claim 12 wherein said pin has a front surface defined by a first radius and a convex back surface defined by a second radius.

15. The rocker joint of claim 14 wherein said pin member front surface is arcuate.

16. The rocker joint of claim 14 wherein said bushing aperture is non-circular.

17. The rocker joint of claim 12 wherein said apertures of said bushings include at least two convex curves, each of said convex curves being defined by a radius having a center point, each of said centers of said radii being on the same side of the aperture.

18. The rocker joint of claim 17 wherein one of said convex curves of said bushing aperture engages and rocks against said front working surface of said pin.

19. The rocker joint of claim 17 wherein each of said pins is fixedly connected to a pair of outer links, each of said bushings is fixedly connected to a pair of inner links, said inner links being interleaved with said outer links.

20. The rocker joint of claim 19 wherein each bushing includes a roller mounted to turn thereon, each of said rollers being adapted to contact the teeth of a sprocket.

* * * * *